United States Patent [19]
Lavoie

[11] Patent Number: 5,911,402
[45] Date of Patent: Jun. 15, 1999

[54] AQUARIUM DRAINAGE ASSEMBLY

[76] Inventor: Jean Roch Lavoie, 1521, Ave. Rawlinson, Mascouche, Que., J7L1X5, Canada

[21] Appl. No.: 09/064,772

[22] Filed: Apr. 23, 1998

[51] Int. Cl.$^6$ .................................................. A01K 63/00
[52] U.S. Cl. .......................... 251/144; 251/147; 119/264
[58] Field of Search .................................... 251/144, 147; 119/245, 263, 264

[56] References Cited

U.S. PATENT DOCUMENTS

| | | | |
|---|---|---|---|
| 3,638,616 | 2/1972 | Carmouche | 119/264 X |
| 4,944,248 | 7/1990 | Torng | 119/264 X |
| 5,640,930 | 6/1997 | Kirby | 119/264 X |

*Primary Examiner*—Kevin Lee
*Attorney, Agent, or Firm*—Mila Shvartsman

[57] ABSTRACT

The present relates to an aquarium drainage assembly comprising a pipe member having an inner nipple adapted to be mounted within a designated opening formed in a wall of the aquarium and an outer nipple extending outside the aquarium. The inner nipple is permanently mounted within the aquarium by a locking nut mounted on the pipe member, the locking nut being adapted to tightly clamp the assembly to the wall. A sealing element is located on the pipe member and placed around the opening adjacent to an inner and an outer surface of the wall; it permits a watertight sealing of the assembly within the opening. A valve element mounted within the outer nipple allows to regulate water circulation through the assembly. The locking nut includes a thread which is tightened around the inner nipple via a corresponding thread formed around an outer surface of the inner nipple and a stopper located on the outer nipple. The assembly tightly clamps to the wall by tightening the nut thus causing the wall to be clamped between the nut and the stopper.

8 Claims, 1 Drawing Sheet

AQUARIUM DRAINAGE ASSEMBLY

The present invention is related to aquarium asseccories, and more particularly to an aquarium drainage assembly.

There are known drainage valves used for drainage of water heater tanks provided with a nipple having a thread adapted to be screwed into an outlet duct of the water heater to facilitate drainage of the tank.

It is also common knowledge for fish lovers having large aquariums that there are no convenient systems for draining aquariums for general cleaning or for changing the water. In most cases, it is necessary to pile the water by means of a pile, or to use a siphon system. This is particularly inconvenient and cumbersome for large aquariums holding 10 gallons of water or more. Nevertheless, water in aquariums must be changed on a regular basis in order to preserve the health of fish (which may, usually, be costly to replace).

The present invention solves this existing problem, and provides a simple arrangement allowing both drainage of water and filing of fresh water, which substantially simplifies the care and maintenance of aquariums and fish.

SUMMARY OF THE INVENTION

Broadly, the present invention relates to an aquarium drainage assembly comprising:
- a pipe member having an inner nipple adapted to be mounted within a designated opening formed in a wall of said aquarium and
- an outer nipple extending outside said aquarium,
- said inner nipple is permanently mounted within said aquarium by means of
- a locking means mounted on said pipe member, said locking means being adapted to tightly clamp said assembly to said wall;
- a sealing element located on said pipe member and placed around said opening adjacent to an inner and an outer surface of said wall, said sealing element being adapted to facilitate a watertight sealing of said assembly within said opening;
- a valve element mounted within said outer nipple, said valve element being provided to regulate water circulation through said assembly.

In another embodiment of the present invention, said locking means comprises:
- a nut provided with a thread, said nut being adapted to be tightened around said inner nipple by means of a corresponding thread formed around an outer surface of said inner nipple;
- a stopper means located on said outer nipple
- wherein said assembly is adapted to be tightly clamped to said wall by means of tightening of said nut causing said wall to be clamped between said nut and said stopper means. Said stopper means comprises a stopper element or shoulder formed around said outer nipple and a washer placed between said stopper element and said sealing element facing the outer surface of said wall.

In yet another embodiment of the present invention, said sealing element comprises two O-rings made of a resilient material, wherein one O-ring is flush with the outer surface of said wall and the other O-ring is flush with the inner surface of said wall. Said outer nipple is adapted to be connected to a water hose by means of a thread formed around an outer surface of said outer nipple.

In still another embodiment, said outer nipple is adapted to be protected against accidental opening of said valve by means of a safety cap provided to cover said outer nipple. Said assembly is additionally secured within said opening by means of adhesive deposited on said O-rings, and said assembly is made of plastic.

DETAILED DESCRIPTION OF THE PREFERRED EMBODIMENT

Figure 1:
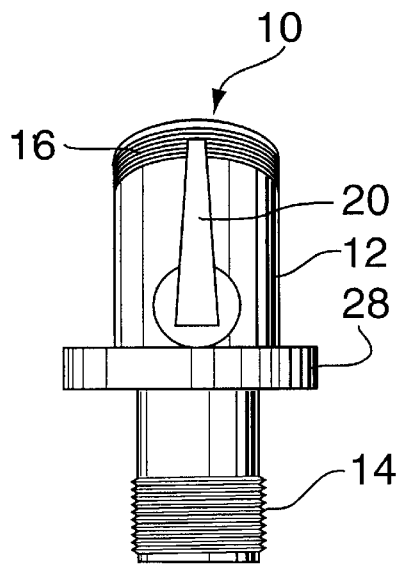
FIG. 1 shows a top view on the aquarium valve of the present invention.
Figure 2:
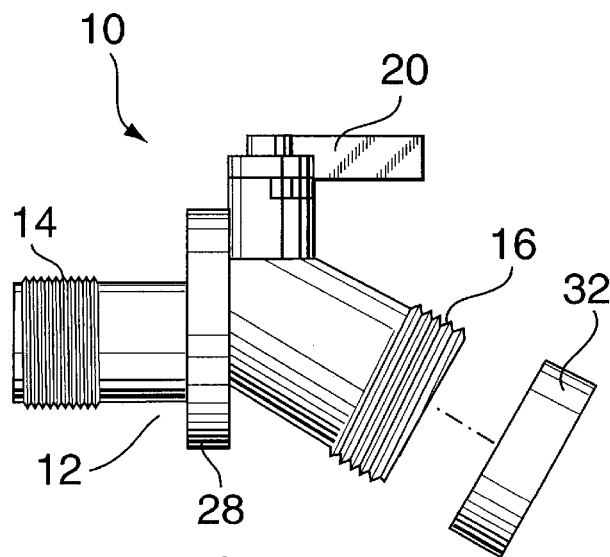
FIG. 2 shows a side view of FIG. 1.
Figure 3:
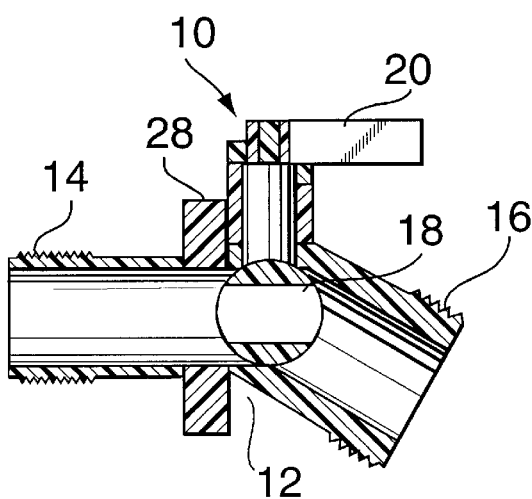
FIG. 3 shows a side cross-sectional view of FIG. 2
Figure 4:
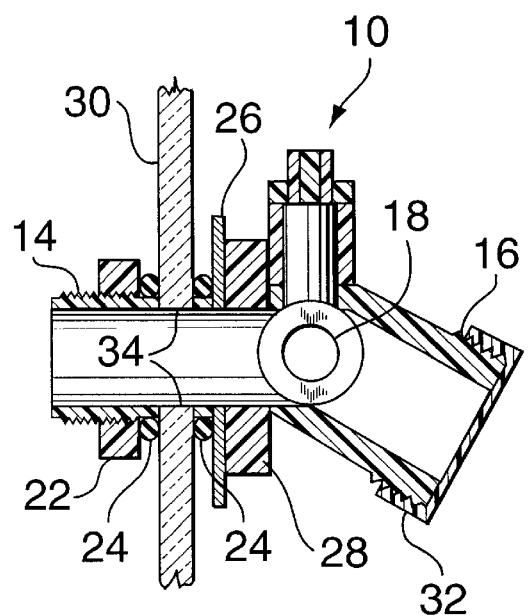
FIG. 4 shows a fragmental cross-sectional view of the complete assembly clamped to the vertical wall of an aquarium.

Referring now to drawings, FIGS. 1–3 show an aquarium valve 10 of the present invention having a pipe member 12 provided with an inner nipple 14 and an outer nipple 16. A valve element 18 (see FIG. 3) having a regulating handle 20 is mounted within the outer nipple 16. The valve 18 is provided to regulate circulation of water through the pipe member 12. The complete aquarium drainage assembly is shown on FIG. 4 and illustrates the fragmental vertical wall 30 of the aquarium having an opening 34 formed for installation of the inner nipple 14 within said hole 34. To immovably clamp the assembly to the wall 30, a washer 26 is mounted on the pipe member 12 to abut a stopper element or shoulder 28 formed around the pipe member 12. Then, one of two O-rings 24 is mounted next to washer 26. This semi-assembled drainage assembly is then placed within the hole 34. To complete the assembly, a second O-ring is mounted adjacent to the inner surface of the wall 30, and finally, a locking nut 22 is tightened on the corresponding thread formed around inner nipple 14. As a result, the complete assembly is clamped very tightly to the wall 30, wherein O-rings 24 serve as a sealing element to prevent any leakage of water from the aquarium.

To achieve even better water sealing, an adhesive such as "TriOlyse"™ or a similar metal/glass glue may be deposited on the O-rings before tightening the nut 22. This glue facilitates better sealing of the assembly, as well as affixing it permanently inside the hole 34. To prevent any accidental leakage of water (for example, if a child turns handle 20 thus opening valve 18) a safety cap 32 may be placed over outer nipple 16. To facilitate easy operation of drainage or filling up a cleaned aquarium, a water hose (not shown) could be attached to the outer nipple 16 by means of a thread formed around outer surface of the nipple 16.

Preferably, the hole 34 is formed in close proximity to the bottom portion of the aquarium to facilitate successful drainage procedure.

Suggested material for the assembly of the present invention should be any type of plastic, which will not corrode in water. O-rings are made of resilient material or rubber. The washer can be made of any metal.

To drill a hole in the aquarium, it has to be emptied and placed on its side or end in such a way that the wall to be drilled is in a horizontal upper position. In view of the fact that the wall is made of glass, certain preventive measures should be taken to prevent the glass from breaking. Firstly, inside surface of the area designated for a hole should be covered with masking tape. Then, a barrier made of calk or any other substance is formed on and around the outside surface designated for drilling; the cavity formed by the barrier is filled with water thus forming a little pool of water on the designated area. This water helps keep the drill bit cool during the drilling operation. A special diamond tip must be used in the drill bit.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

I claim:

1. An aquarium drainage assembly comprising:

a pipe member having an inner nipple adapted to be mounted within a designated opening formed in a wall of an aquarium and an outer nipple extending outside said aquarium, said inner nipple is permanently mounted within said aquarium by means of a locking means mounted on said pipe member, said locking means being adapted to tightly clamp said assembly to said wall;

a sealing element located on said pipe member and placed around said opening adjacent to an inner and an outer surface of said wall, said sealing element being adapted to facilitate a watertight sealing of said assembly within said opening;

a valve element mounted within said outer nipple, said valve element being provided to regulate water circulation through said assembly.

2. An aquarium drainage assembly according to claim 1, wherein said locking means comprises:

a nut provided with a thread, said nut being adapted to be tightened around said inner nipple by means of a corresponding thread formed around an outer surface of said inner nipple;

a stopper means located on said outer nipple wherein said assembly is adapted to be tightly clamped to said wall by means of tightening of said nut causing said wall to be clamped between said nut and said stopper means.

3. An aquarium drainage assembly according to claim 2, wherein said stopper means comprises a stopper element or shoulder formed around said outer nipple and a washer placed between said stopper element and said sealing element facing the outer surface of said wall.

4. An aquarium drainage assembly according to claim 1, wherein said sealing element comprises two O-rings made of a resilient material, wherein one O-ring is flush with the outer surface of said wall and the other O-ring is flush with the inner surface of said wall.

5. An aquarium drainage assembly according to claim 1, wherein said outer nipple is adapted to be connected to a water hose by means of a thread formed around an outer surface of said outer nipple.

6. An aquarium drainage assembly according to claim 1, wherein said outer nipple is adapted to be protected against accidental opening of said valve by means of a safety cap provided to cover said outer nipple.

7. An aquarium drainage assembly according to claim 4, wherein said assembly is additionally secured within said opening by means of adhesive deposited on said O-rings.

8. An aquarium drainage assembly according to claim 1, wherein said assembly is made of plastic.

\* \* \* \* \*